A. W. GATES.
SAW.
APPLICATION FILED OCT. 15, 1917.
1,295,477.
Patented Feb. 25, 1919.
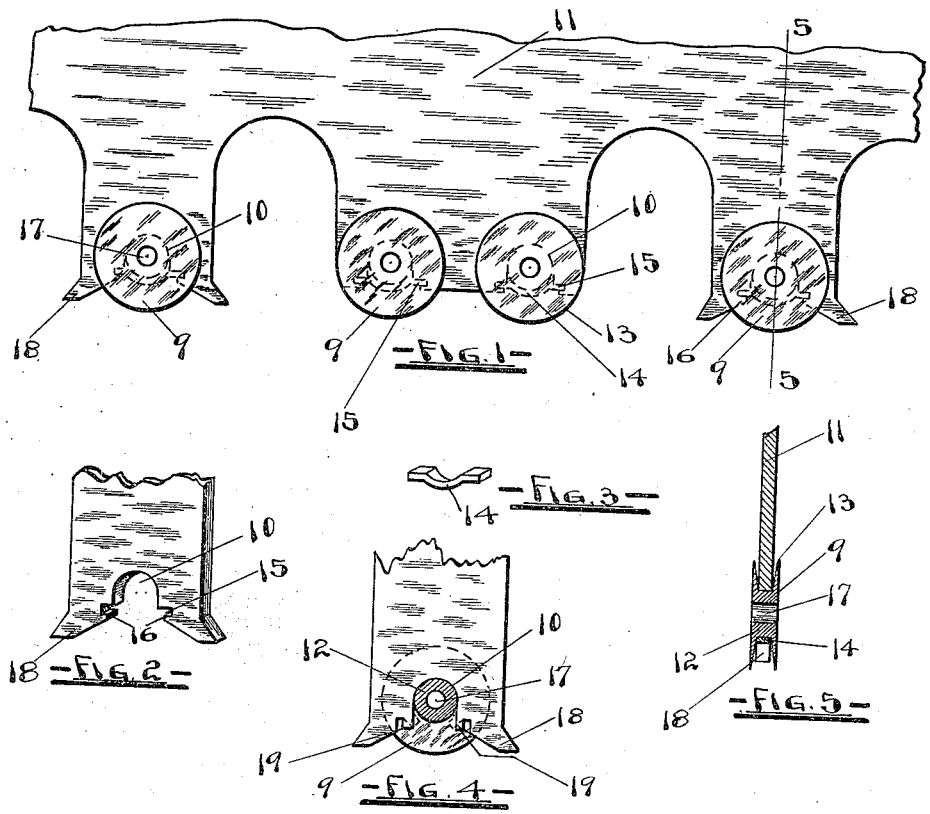
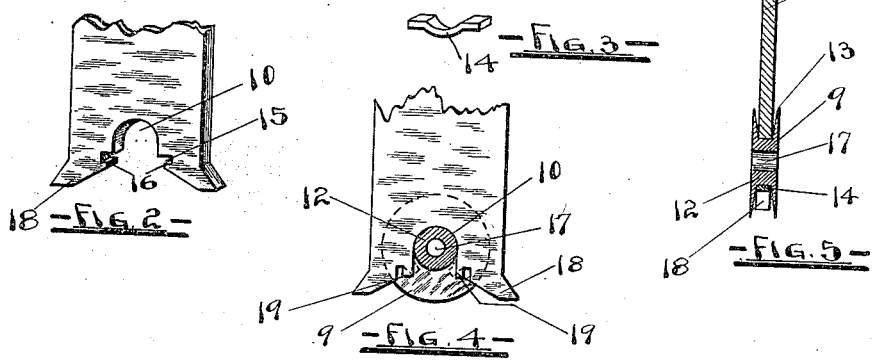
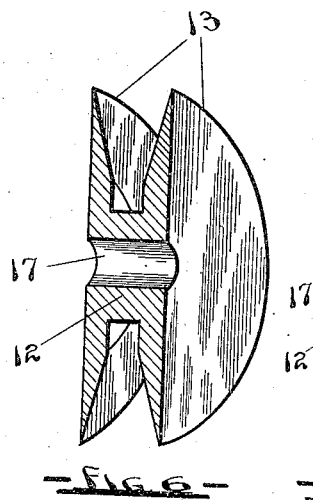
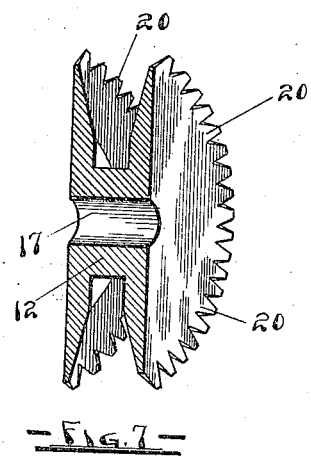
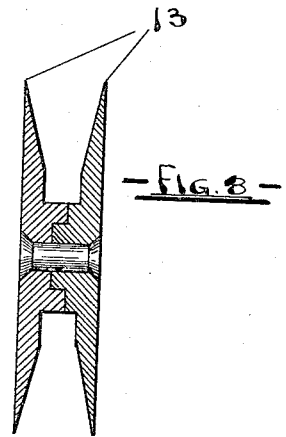
INVENTOR
ALBERT W. GATES
BY C. F. Blake
ATTY

UNITED STATES PATENT OFFICE.

ALBERT W. GATES, OF PORTLAND, OREGON.

SAW.

1,295,477.   Specification of Letters Patent.   Patented Feb. 25, 1919.

Application filed October 15, 1917. Serial No. 196,767.

*To all whom it may concern:*

Be it known that I, ALBERT W. GATES, a citizen of the United States, residing at Portland, county of Multnomah, State of Oregon, have invented certain new and useful Improvements in Saws, of which the following is a specification.

My invention relates to saws in general, the particular object being to provide a saw that shall be more easily manipulated than the present types, which object is accomplished by the provision of roller cutters in the place of the toothed cutters heretofore used.

I accomplish the above object by means of the construction illustrated in the accompanying drawing which is a part of this application for Letters Patent, like characters of reference indicating like parts throughout the several views, and in which:—

Figure 1 is a side elevation of a portion of a saw blade embodying my invention.

Fig. 2 is a detail of one raker tooth with the cutter removed therefrom.

Fig. 3 is a detail of the keeper.

Fig. 4 is a detail of a modified form of saw tooth, the roller cutter being shown in section therein.

Fig. 5 is a sectional elevation upon line 5—5 of Fig. 1.

Fig. 6 is a sectional perspective view of one of the roller cutters, upon an enlarged scale.

Fig. 7 is a sectional perspective view of a modified form of cutter.

Fig. 8 is a sectional elevation of a still further modification of the cutter.

In general my invention consists in inserting flanged cutter rollers in the saw edge to score the material, and raker teeth to remove the material between the scores made by the roller cutters.

A preferred form of my invention is illustrated assembled in Fig. 1, the rollers 9 being rotatably mounted in notches 10 in the saw blade 11.

Each roller consists of a hub portion 12 adapted to fit the slot 10 when inserted therein, and a pair of sharp edged cutting flanges 13.

To retain rollers 9 in place when the saw is not in use, or in use when the rollers are not in contact with the material, I provide keepers 14 adapted to be pressed into slots 15 in the saw blade adjacent slots 10, said keeper being curved to fit the hub portion 12 of the roller 9.

The keepers are made to enter freely between the lips 16 which outline the slots 15, and are then forced into slots 15 by a blow from a hammer and punch, after the roller has been inserted in its respective notch 10.

To remove the roller 9 I provide therein orifices 17 into which may be inserted a bar, or other convenient tool, which can be struck with a hammer so as to force the keeper from its seat in slot 15 and thus release the roller.

Raker teeth 18 are provided to remove the material between the scores made by the cutting flanges 13 of the rollers.

A modified method of retaining the rollers within slots 10 is illustrated in Fig. 4, wherein are shown ears 19 which may be inwardly bent after the insertion of the roller, as shown in dotted lines.

A modified form of cutting roller is illustrated in Fig. 7 wherein the cutting flange is toothed, as shown at 20.

A further modification of the cutting roller is illustrated in Fig. 8, wherein the roller is formed of two members the hubs of which are male and female, and which are united by means of a rivet, this form of roller being applicable to a saw having punched or drilled holes in place of the slots 10.

My invention may be made of any size and constructed of any material deemed convenient and suitable in a device of this character, and while I have illustrated and described a form of construction and arrangement of parts found desirable in materializing my invention, I wish to include in this application for letters patent all mechanical equivalents and substitutes that may fairly be considered to come within the scope and purview of my invention as defined in the appended claims.

Having disclosed my invention so that others skilled in the art may be enabled to construct and to use the same, what I claim as new, and desire to secure by Letters Patent is;—

1. A saw blade having a tooth provided with a slot, said slot extending to and being open at the outer end of said tooth and being semi-circular at the inner end thereof; in combination with a rotary cutter comprising a hub and a pair of sharpened circular flanges, said hub being mounted for rotation in the inner end of said slot, and said flanges being arranged upon opposite sides of said tooth; and a keeper arranged with its intermediate portion bearing against the hub and between the flanges of said cutter.

2. A saw blade having a tooth provided with a slot, said slot extending to and being open at the outer end of said tooth and being semi-circular at the inner end thereof, and said tooth also having notches at opposite sides of said slot; in combination with a rotary cutter comprising a hub and a pair of sharpened circular flanges, said hub being mounted for rotation in the inner end of said slot, and said flanges being arranged upon opposite sides of said tooth; and a keeper arranged with its opposite ends in said notches, and its intermediate portion bearing against the hub and between the flanges of said cutter.

In witness whereof I claim the foregoing as my own I hereunto affix my signature in the presence of two subscribing witnesses, at Portland, county of Multnomah, State of Oregon, this 24th day of September, 1917.

ALBERT W. GATES.

Witnesses:
J. M. WHITE,
C. F. BLAKE.

Copies of this patent may be obtained for five cents each, by addressing the "Commissioner of Patents, Washington, D. C."